United States Patent
Velten et al.

(10) Patent No.: US 8,402,448 B2
(45) Date of Patent: Mar. 19, 2013

(54) COMPILER SYSTEM AND A METHOD OF COMPILING A SOURCE CODE INTO AN ENCRYPTED MACHINE LANGUAGE CODE

(75) Inventors: Joachim Velten, Biedenkopf (DE); Marcus Janke, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1184 days.

(21) Appl. No.: 12/233,207

(22) Filed: Sep. 18, 2008

(65) Prior Publication Data
US 2010/0070953 A1    Mar. 18, 2010

(51) Int. Cl.
*G06F 9/45* (2006.01)

(52) U.S. Cl. ......................................... 717/140
(58) Field of Classification Search .................... 717/140
See application file for complete search history.

(56) References Cited

U.S. PATENT DOCUMENTS

| | | | |
|---|---|---|---|
| 5,313,635 A * | 5/1994 | Ishizuka et al. ............... | 717/173 |
| 5,386,469 A * | 1/1995 | Yearsley et al. ............... | 713/190 |
| 6,034,902 A * | 3/2000 | Zettler et al. ................. | 365/195 |
| 6,643,775 B1 * | 11/2003 | Granger et al. ............... | 713/190 |
| 6,678,837 B1 * | 1/2004 | Quach et al. ................. | 714/38.13 |
| 7,076,651 B2 * | 7/2006 | Droge ............................ | 713/151 |
| 7,269,742 B2 | 9/2007 | Gammel et al. | |
| 2003/0131345 A1 * | 7/2003 | Wilkerson et al. ............ | 717/156 |
| 2010/0205459 A1 | 8/2010 | Schwarz | |

FOREIGN PATENT DOCUMENTS
WO WO-01/54083 A1 7/2001
WO WO-2009/040207 A1 4/2009

* cited by examiner

*Primary Examiner* — Wei Zhen
*Assistant Examiner* — Lanny Ung
(74) *Attorney, Agent, or Firm* — Dickstein Shapiro LLP (57) ABSTRACT

A compiler system including a compiler configured to compile a source code into a machine language code is presented, so that the machine language code is executable on a processing unit, wherein the processing unit comprises an internal register that is changing its state responsive to an execution of the machine language code. The compiler is configured to encrypt the machine language code based on an encryption function that depends on the state of the internal register.

10 Claims, 8 Drawing Sheets

COMPILER SYSTEM AND A METHOD OF COMPILING A SOURCE CODE INTO AN ENCRYPTED MACHINE LANGUAGE CODE

TECHNICAL FIELD

The present invention relates to a compiler system for compiling a source code into machine language code, so that the machine language code is executable on a processing unit.

For various reasons programs of micro-controller or, in general processing units or electronic devices sometimes have to be protected against spying out or copying. For example a security micro-controller may be designated for special security applications, like personal identification, money cards, pay-TV or access rights to certain areas or buildings, and these programs should be kept secret in order to prevent unauthorized parties from endangering the respective facilities, or prevent third parties from abnormal handling the respective security products.

DETAILED DESCRIPTION OF THE EMBODIMENTS

Figure 1:
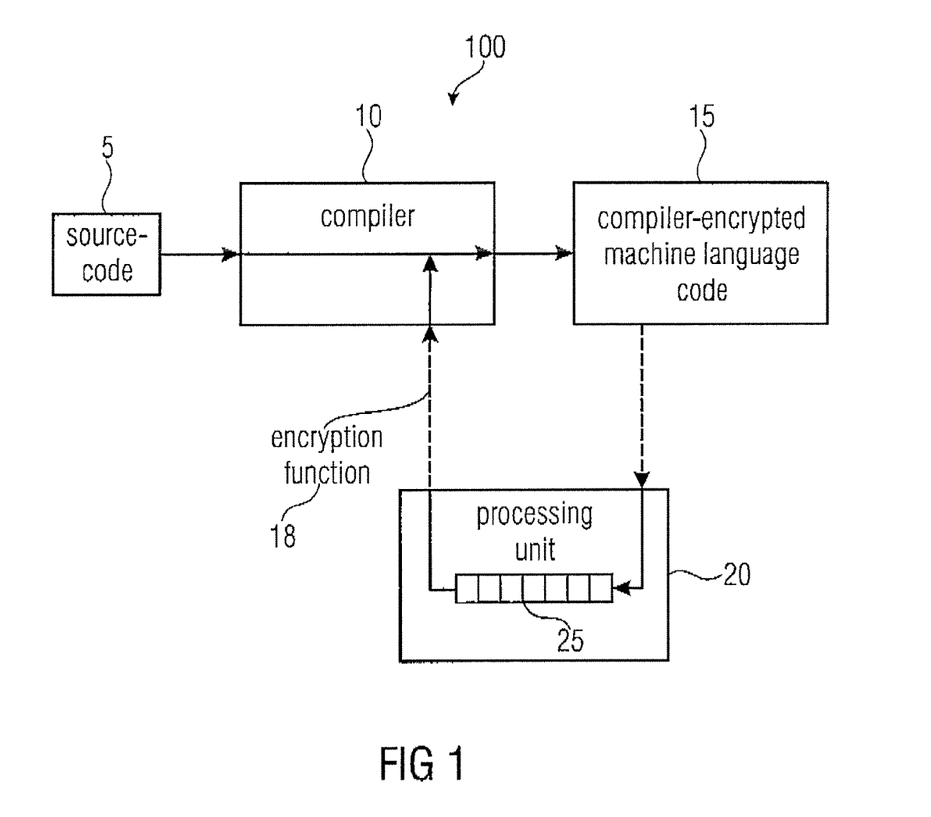
FIG. 1 shows a schematic diagram of a compiler system for compiling a source code into a machine language code for a processing unit according to an embodiment of the invention.

In FIG. 1, a schematic diagram of a compiler system 100 for compiling a source code 5 into a machine language code 15 according to an embodiment of the invention is shown. The compiler system 100 comprises a compiler 10. The compiler 10 is capable of compiling a source code 5 into a machine language code so that the machine language code is executable on a processing unit 20. The source code may, for example, a Java, C, C++ or Visual Basic Code. The machine language code is, for example, a binary code including a sequence of the machine code directly executable on the processing unit 20, which in turn, may, for example, be based on a 8051, 8031 or 8751 architecture. The processing unit 20 comprises an internal register 25, which changes its state responsive to an execution of the machine language code 15. The compiler 10 is also configured to encrypt the machine language code based on an encryption function 18 which depends on the state of the internal register 25 of the processing unit 20.

The dashed line between the processing unit 20 and the compiler 10 and the compiler-encrypted machine language code 15 shall indicate that there may be no direct connection between the processing unit and the compiler. The compilation with the compiler 10 can, for example, be performed at a customer's place and hence, the encryption function may be transferred via the Internet, via any other digital storage medium, like a CD or DVD. The same refers to the transfer or the storage of the compiler-encrypted machine language code, which is transferred back, for example, to the place of the manufacturer of the processing unit. The source code 5 for the processing unit may be generated by the customer and an encryption function may be generated by a manufacturer of the processing unit.

The source code 5 may, for example, be a program or a firmware for an electronic device, a micro-controller, a processing unit, a security controller or a central processing unit (CPU). The compiler 10 may be configured to compile and link the provided source code 5 into a machine language code. This compiled machine language code may be encrypted by the compiler or an encryption tool of the compiler system 100 (not shown in FIG. 1) with an encryption function. This encryption function may depend on the state of an internal register of the processing unit 20 on which the machine language code is intended to run and in particular, on the state of the internal register 25 at the time the processing unit 20 executes the program 15 with the state varying during the execution according to an embodiment of the invention. In other words the internal register 25 is configured to change its state responsive to an execution of the machine language code on the processing unit.

The internal register 25 may, for example, be a program counter (PC) of the processing unit and the encryption function which is used by the compiler to encrypt the source code of the program for the processing unit, may be designed to combine an expected state of the PC at the time of fetching a respective instruction of the machine language code or a word thereof from the memory, with the respective instruction or word thereof. That means, for example, an expected address for an instruction or a word of an instruction of the machine language code in the program counter can be used to define an encryption function or its key, respectively, to encrypt the source code in the compiler 10 into a compiler-encrypted source code.

Figure 2:
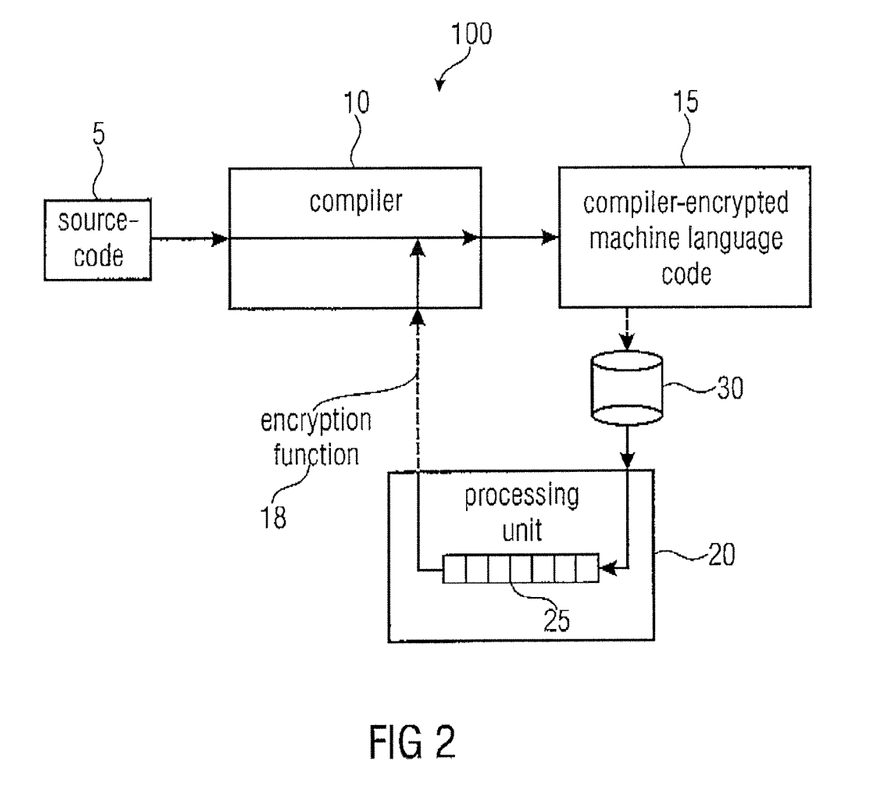
FIG. 2 shows another schematic diagram of a compiler system for compiling a source code into a machine language, wherein the compiler-encrypted machine language code is burned onto a read-only memory, connected to the processing unit according to an embodiment of the invention.

A manufacturer of the processing unit may, for example, deliver the definition of the encryption function to a customer who takes care about the program of the respective processing unit. The encryption function can be implemented in the compiler 10 or, according to another embodiment of the invention, in a separate encryption tool forming a tool chain along with the compiler 10 so that an operation code or program for the processing unit can already be encrypted at a customer's site during the generation of the operation code (opcode)—the machine language code for the processing unit. Thereby, the security can be increased further, since after the compilation of the source code and the encryption with the encryption function a compiler-encrypted machine language code is available. A customer may provide this compiler-encrypted machine language code to the manufacturer of the processing unit. Then, the compiler-encrypted machine language code may be stored in a program memory 30 (see FIG.

2) connected to the processing unit 20. That means, the instructions of the program, which is to be stored or burned into the program memory of the processing unit, may already be compiler-encrypted at the time same are forwarded from the customer to the manufacturer. This may provide an additional protection against spying-out by possible attackers.

According to another embodiment of the invention (FIG. 2), the compiler system 10 may comprise a memory, for example a read-only memory (ROM), wherein the memory 30 is connected to the processing unit. The compiler 10 may be configured to store the compiler-encrypted machine language code onto the memory 30. The memory 30 may be, for example, a read-only-memory, e.g. an electrically erasable program read-only-memory (EEPROM), a mask-ROM, an erasable programmable read-only-memory (EPROM), a programmable read-only-memory (PROM) or any other read-only memory. But the memory 30 may be any type of memory, which is capable to store the compiler-encrypted machine language code. Such a memory may be, for example, a random-access-memory (RAM), e.g. a dynamic random-access-memory (DRAM), a static RAM (SRAM), a phase change RAM (PCRAM), a magnetoresistive RAM (MRAM) or a ferroelectric RAM (FRAM). The memory can be also a ferromagnetic memory, like a hard disc drive (HDD), an optical memory, like a CD, a DVD, a Blue-ray disc etc.

According to an embodiment of the invention, the compilation and the encrypting of the source code may be performed on a personal computer or a computer system at a first location. The processing unit 20 may be on an independent chip at a second location. The compiler-encrypted machine language code may therefore be transferred for example via Internet or also via other digital storage media to the second place.)

The read-only memory 30 may be an external read-only memory or in general an external program memory or it may be integrated on the processing unit. The program memory 30 may be connectable or coupled to the processing unit.

Figure 3:
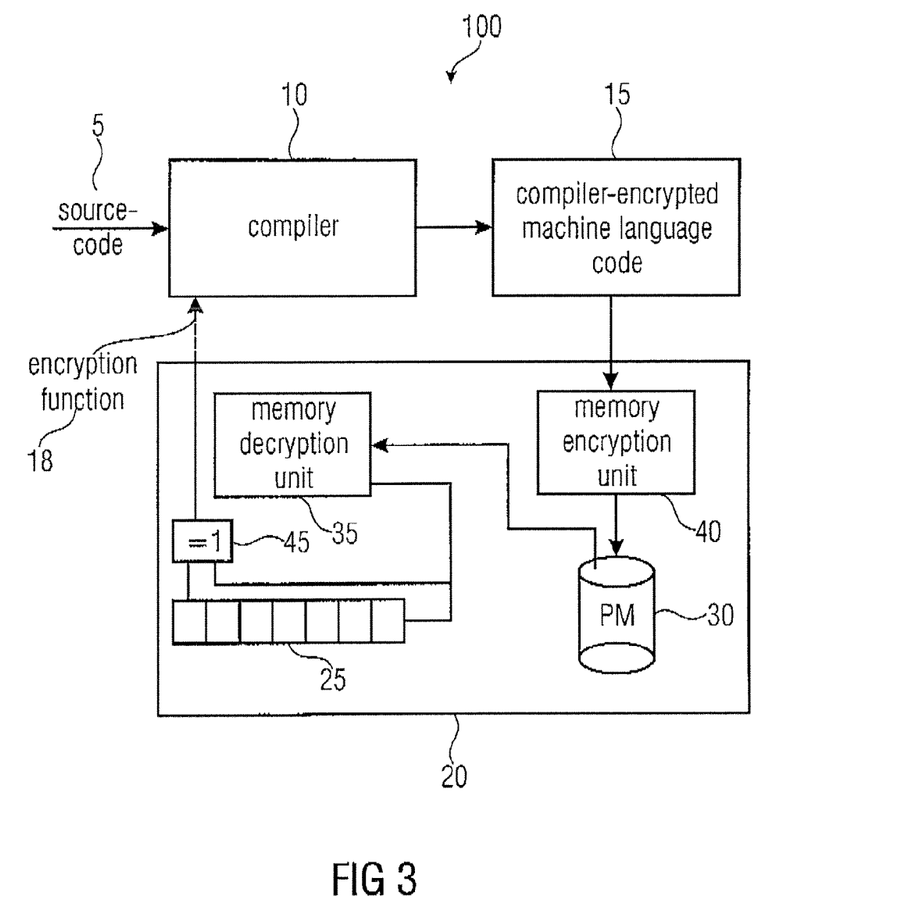
FIG. 3 shows another schematic diagram of a compiler system with a processing unit, wherein the processing unit comprises a memory encryption unit and a memory decryption unit as well as a program memory and an internal register according to an embodiment of the invention.

As it is shown in the schematic diagram in FIG. 3, the compiler system 100 for compiling a source code into a machine language code may comprise a processing unit 20, wherein the processing unit comprises or is connected to a program memory 30. The processing unit further comprises a memory decryption unit 35 and a memory encryption unit 40. The compiler 10 may be configured to store the compiler-encrypted machine language code 15 via the memory encryption unit 40 into the program memory 30. According to this embodiment, the memory encryption unit may be configured to encrypt the compiler-encrypted machine language code 15 a second time, depending on a memory address, where the machine language code is to be stored in the program memory 30. In other words, depending on a memory address where the compiler-encrypted machine language code is to be stored in the processing unit 20, the memory encryption unit 40 may perform a second encryption of the compiler-encrypted machine language code. Because of this second encryption, the protection of the processing unit against a hostile attack can be further increased. The processing unit 20 may furthermore comprise a memory decryption unit 35, which is configured to decrypt the twice-encrypted machine language code read from the program memory to obtain the compiler-encrypted machine language code and in a further decryption step to decrypt, based on a decryption function which is based on the state of the internal register 25, in order to attain instructions which can run on the processing unit 20. The encryption function underlying the machine encryption unit 40 may be more complicated than the encryption function 18.

According to another embodiment of the invention, the processing unit 20 comprises a program memory 30 and a memory decryption unit 35 for decrypting instruction data read from the program memory. The compiler system can be configured to store the compiler-encrypted machine language code in a further encrypted manner into the program memory which, when decrypted by the memory decryption unit 35, results in the compiler-encrypted machine language code.

During the operation of the processing unit, the processing unit may read and write instructions to the program memory 30. The instructions may again depend on a memory address of the instruction to be stored in the program memory and which the memory encryption unit encrypts.

As it is shown in FIG. 3, the encryption function 18 may depend on a logical bit-wise exclusive OR (XOR) or an exclusive NOT OR (NXOR) operation between the state of the internal register 25 and the machine language code. According to one embodiment, this logical operation is performed by a XOR logic operation between the instruction or the generic operation code and the actual value of the program counter. The internal register may be the program counter of the processing unit according to embodiments of the invention. An instruction for the processing unit may comprise payload data, wherein the state of those payload data may influence a behavior of the processing unit and error detection data enabling checking an integrity of the payload data and representing don't-care data with respect to the behavior of the processing unit. According to embodiments of the invention, the instruction of the machine language code may for example comprise check bits in the operation code. Such check bits may be for example parity bits or other code segments with more advanced algorithms to detect an error or discover a forcing attack from a hostile attacker on the processing unit.

Figure 4:
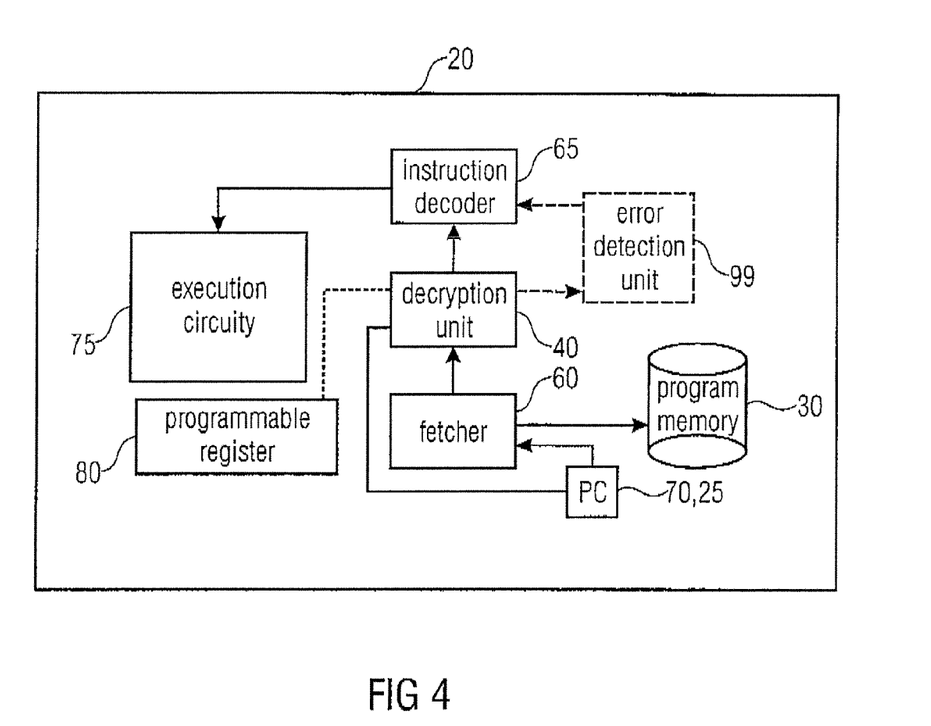
FIG. 4 shows a schematic diagram of a processing unit for executing a machine language code according to another embodiment of the invention.

In FIG. 4, a schematic diagram of a processing unit 20 for executing a machine language code is shown. The processing unit 20 comprises a register for a program counter 70, an execution circuitry 75, a fetcher 60, a decryption unit 40 and an instruction decoder 65. The program counter 70 may be the internal register 25. The fetcher 60 is configured to fetch a word from an address of a program memory 30, which is connectable to the processing unit 20. According to an embodiment of the invention the address of the word may correspond to a current state of the program counter 70, and wherein the program counter 70 may be configured to be incremented upon fetching. An instruction for the processing unit may consist of at least one word. A word can, for example, comprise a byte or two bytes of information, it may be considered as the smallest connected block of an instruction for the processing unit. An instruction for a processing unit may, for example, be divided into an operation code, which may be a number related to a certain machine instruction, e.g. a multiplication, an incrementation or an order to load a register, and an operand, i.e. a parameter operated upon the operation code. An operand can be e.g. an address or a register.

An instruction for the processing unit 20 may include one or more words. The fetcher may be configured to word-wise fetch words from the program memory at sites pointed by the PC. The decryption unit 40 is configured to decrypt the word fetched from the program memory 30, and the instruction decoder 65 is configured to analyze the decrypted word. The instruction decoder 65 decides whether the decrypted word belongs to an instruction that encompasses a further word or not. That means, the instruction decoder may distinguish whether the fetched word from the program memory is already a complete instruction which can be executed by the execution circuitry 75 of the processing unit 20 or if there is still, for example, an operand of the current instruction missing. If the instruction does not encompass further words, the execution circuitry 75 is driven according to the instruction. In any case, the fetcher 60 keeps on fetching words from program memory 30 at sites indexed by the program counter (PC), such as the missing word of the instructions or the word(s) of the next instruction. According to this embodiment, every word of the instruction belongs to a certain address in the program memory. The program counter 70 may be incremented after each fetching a word of the instruction. In another embodiment of the invention the program counter 70 is not incremented after each fetching. Of course some of the instructions may manipulate the program counter when executed such as jump instructions.

According to another embodiment of the invention, the processing unit 20 may comprise a program memory 30, an internal register 25 changing its state responsive to an execution of the machine language code. The processing unit may further comprise a decryption unit 40, which is configured to decrypt an encrypted machine language code received from the program memory based on a decryption function. The decryption function may depend on the state of the internal register 25. The decrypted machine language code is executable on the processing unit 20. The decrypted machine language code may be interpreted or analyzed by an instruction decoder 65. The machine language code may comprise instructions to be executed on the processing unit. The internal register 25 may, for example, the program counter 70. According to embodiments of the invention, the decryption unit 40 can decrypt for example the compiler-encrypted machine language code or the twofold-encrypted machine language code so that, after the decryption, the machine language code is executable or can drive an execution circuitry 75 of the processing unit 20. According to embodiments of the invention, the machine language code may comprise payload data, wherein such data can influence a behavior of the processing unit and error detection data enabling checking an interpreting of the payload data and representing don't-care data with respect to the behavior for the processing unit. The processing unit 20 may furthermore comprise an error detection unit 99. The decryption unit may be configured to decrypt an encrypted machine language code received from the program memory, and the error detection unit may be configured to compare the error detection data of the decrypted machine language code with the expected error detection data. The error detection unit may furthermore provide a feedback signal whether the error detection data of the machine language code is different from the expected error detection data. In this way the integrity of the machine language code can be checked, and a possible attack on the processing unit or on the machine language code can be discovered. In an alternative embodiment of the invention, the error detection unit may be configured to interrupt a feedback signal if the error detection data of the decrypted machine language code is different from the expected error detection data.

According to another embodiment of the invention (see FIG. 4) the processing unit 20 may comprise, a programmable register 80. In this embodiment, the decryption unit 40 may be configured to decrypt the word fetched from the program memory 30 by the fetcher 60 on the basis of a decryption function, which depend on the one hand on the state of the internal register 25, for example the program counter 70, and the state of the programmable register 80. The decrypted machine language code may be executable on the processing unit and the respective instruction may drive the execution circuitry 75. The programmable register 80 may be, for example, a pseudo-random-feedback-shift register, which is fed with a predetermined seed. The programmable register 80 may be configured to be operated and programmed with certain software. The programmable register may be a state register.

In other embodiments of the invention, the complexity of the encryption function and the respective decryption function may be increased. For example, additional logic operations may be included or more complex algorithms may be used for encrypting and decrypting the machine language code. This may be used to increase the strength of the security algorithm and/or to achieve an error multiplication.

According to another embodiment of the invention, the processing unit 20 may again comprise a register for a program counter 70, an execution circuitry 75, a fetcher 60, a decryption unit 40 and an instruction decoder 65. The fetcher 60 may he configured to fetch word-by-word the machine language code from an address of the program memory 30 corresponding to the current state of the program counter 70. The decryption unit may be configured to decrypt the word-by-word machine language code fetched from the program memory 30 and to analyze the decrypted word and decide as to whether the decrypted word belongs to an instruction of the machine language code encompassing further words or not, and if the instruction does not encompass further words, drive an execution circuitry 75 of the processing unit according to the instruction of the machine language code. In an alternative embodiment of the invention, the fetcher may be configured to fetch a complete instruction, which may encompass more than one word from the program memory 30. A word may comprise, for example, one or more bytes. In this case, the decryption unit 40 may be configured to decrypt using a decryption function depending on a state of an internal register, a complete instruction for the execution circuitry 35. In embodiments of the invention, an encrypted machine language code instruction may be stored instruction-by-instruction in the program memory 30. An instruction may comprise for example one byte, two bytes, three bytes, four bytes or 64 bits according to some embodiments of the invention.

Figure 5:
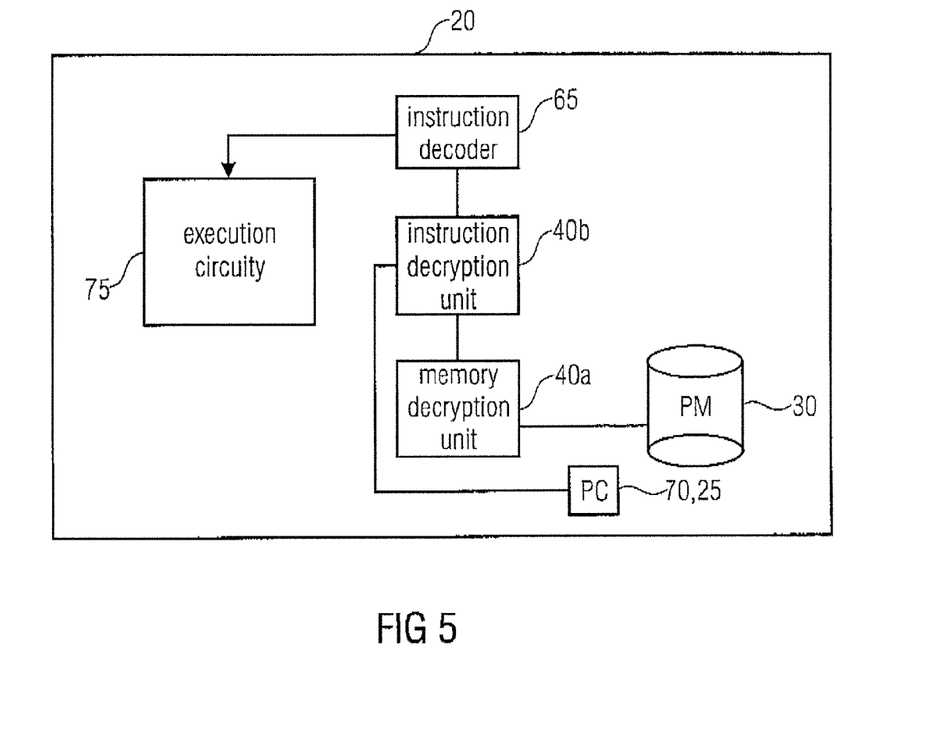
FIG. 5 shows a flowchart for a method of encrypting a source code into an encrypted machine language code, wherein the encrypted machine language code is decrypted by an instruction decoder of the processing unit according to a further embodiment of the invention.

In FIG. 5, a schematic diagram of a processing unit 20 is depicted according to another embodiment of the invention. The processing unit 20 comprises a register for a program counter 70, an execution circuitry 75, a memory decryption unit 40a, a decryption unit 40b and an instruction decoder 65. A program memory (PM) 30 may be integrated on the processing unit 20 or may be connectable to the processing unit 20. The memory decryption unit 40a may be configured to decrypt instructions received from the program memory 30 depending on a memory address pointing to a memory location where the instruction is stored in the program memory. The instruction decryption unit 40b may be configured to decrypt the memory address-dependent decrypted instructions from the memory decryption unit 40a depending on a current state of the program counter 70, 25. In other words, the memory decryption unit 40a decrypts the memory address-dependent part and the instruction decryption unit 40b decrypt, for example, the compiler-encrypted machine language code, as described in context with other embodiments of the invention. The instruction decoder 65 may then be configured to decode the program counter-dependently decrypted instructions from the instruction decryption unit 40b. The instruction decoder 65 may be also configured to drive the execution circuitry 75 according to the decoded instructions. In this embodiment, the instruction decoder may be configured to interpret the encrypted instruction and to drive an execution circuitry of the processing unit according to the interpreted instructions.

The memory decryption unit 40a may alternatively be configured to decrypt a word of an instruction stored in the program memory, wherein an instruction comprises at least one word.

According to some embodiments of the invention, the program memory 30 may comprise a plurality of memory blocks and wherein the program memory is configured to store a plurality of instructions in the memory block. In other words, the program memory 30 may be divided into a plurality of subdivisions, the so-called memory blocks, wherein in one memory block a plurality of instructions may be stored. An instruction itself may be separated in one or more words, wherein for example one word may comprise the operation code and other words of the instruction may comprises operands of the instruction. An address for an instruction in a program memory may depend on a memory block address in the program memory.

Figure 6:
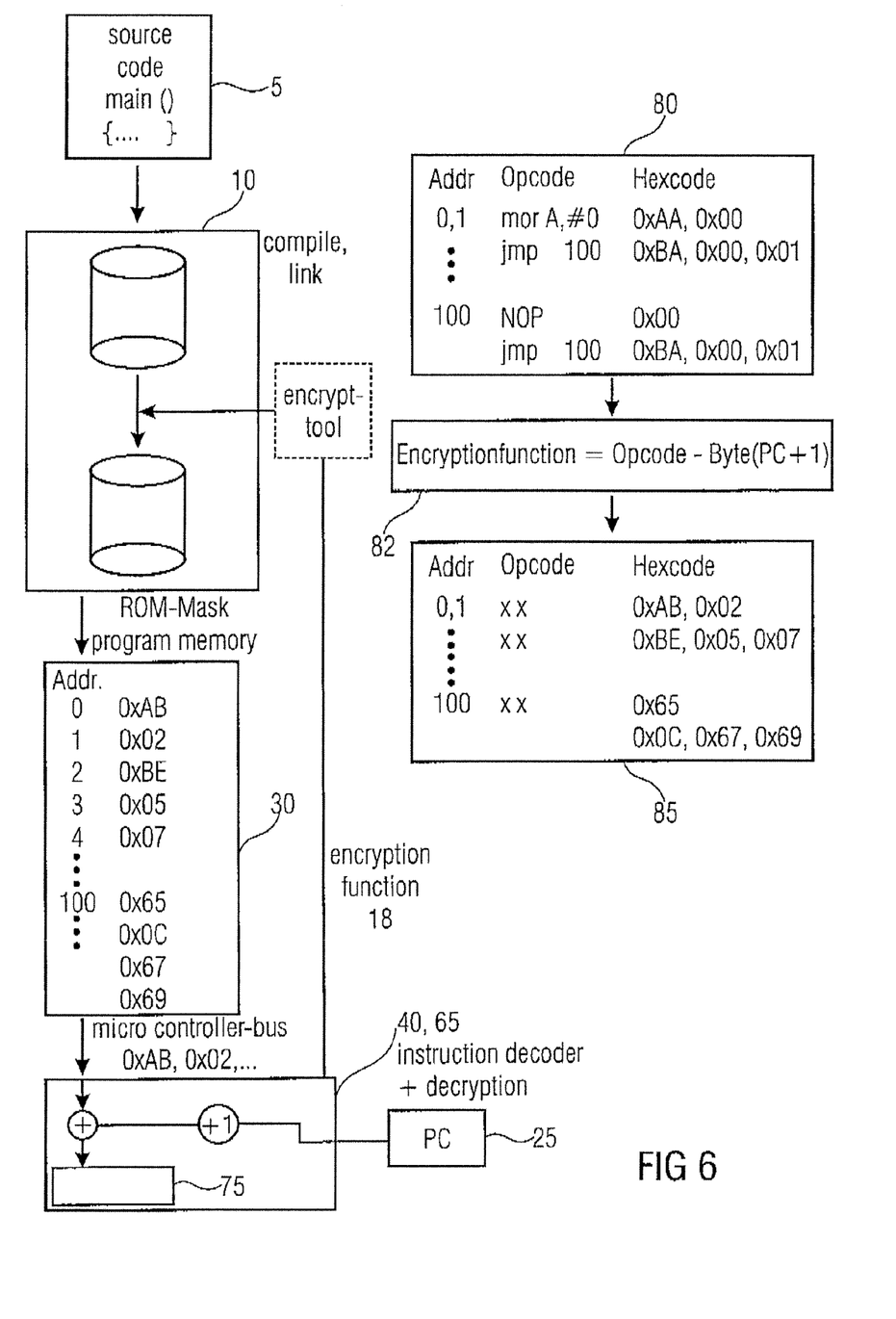
FIG. 6 shows a flowchart for a method of compiling a source code into an encrypted machine language code according to an embodiment of the invention.

FIG. 6 shows a flow diagram and an example for a compiler system and a method of encrypting a source into an encrypted machine language code and a schematic diagram of a processing unit for executing a decrypted machine language code.

As it is shown in FIG. 6, a source code 5 may, for example, be written in C computer language or any other computer language suitable for this. The source code 5 may be compiled and linked by a compiler 10, so that after the compilation a machine language code is created which can be executed on a processing unit. For the sake of clarity an example of such a piece of machine language code is shown in the box 80. An instruction of the machine language code may comprise an operation code, for example mov A and an operand #0. In this case, the instruction may comprise two words, one word may, for example, be mov A and the other word may be #0. This kind of instruction code may be an assembler code. Each word of the assembler code may correspond to a certain expected address in a program counter of the processing unit, starting for example with address 0 for the assembler code mov A. The compiler 10 may generate directly from the source code 5 a hexadecimal form of the instruction, which can be used for driving the processing unit. In the example shown in box 80 the assembler instruction mov A at address 0 may correspond in a hexadecimal form to the expression 0xAA. The operand #0 may be stored on the address 1 and may be in hexadecimal form correspond to the value 0x00. The other instructions in box 80 can be interpreted in the same way.

The method of compiling a source may further comprise encrypting the machine language code, for example, as it is shown in the box 80, based on an encryption function. In this embodiment, the encryption function (box 82, FIG. 6) may be defined as a function of the operation code byte depending on a program counter value incremented by 1. In other words, the compiler 10 or an encrypt tool, which may be integrated in the compiler or which may be a separate piece of software, may apply an encryption function which depends on the state of an internal register, for example, the program counter. In this embodiment the complexity of the encryption function is increased by adding 1 to the program counter value. The compiling of the source code and the encrypting of the machine language code based on an encryption function can, for example, be performed at a location of a customer for the processing unit. The storing and burning of the encrypted machine language code may be performed at a manufacturer's site of the processing unit.

After encrypting the machine language code based on the above-mentioned encryption function, an encrypted machine language code is generated (see box 85). The hexadecimal machine language code 0xAA at address 0 in box 80 has now changed to the encrypted machine language code 0xAB. According to the encryption function 82, the first operation code byte 0xAA is encrypted by the program counter value incremented by 1, which means address 0 plus 1, and therefore the compiler-encrypted machine language code becomes 0xAB. At address 1, the hexadecimal code is 0x00 (see box 80), which is encrypted by the compiler 10 or a separate encryption tool, so that the compiler-encrypted machine language code is 0x02. The program counter address is in this example 1 (address 1) plus 1, so that the compiler-encrypted machine language code is now 0x02. The remaining machine language code can be encrypted in the same way. The compiler-encrypted machine language code may then be stored or burned onto a program memory or on a memory, e.g. on a read-only memory (ROM-mask).

The encrypted machine language code may, for example, be stored in an address-ascending order in the program memory 30 of a processing unit 20. As described above, in this embodiment the machine language code may be transferred word-by-word via a micro-controller program bus to the decryption unit 40. The decryption unit 40 may be able to decrypt depending on a decryption function, which may be in this example the operation code byte depending on the program counter value minus 1. The decryption function may be the inverse encryption function. After decrypting the compiler-encrypted machine language code, an instruction decoder may analyze the decrypted machine language code and drive the processing unit according to the machine language code instructions. The decryption function may depend on an internal state or an internal register, for example the program counter.

By using an encryption function and a decryption function, which depend on an internal register of a processing unit and wherein the internal register is changing its state responsive to an execution of the machine language code it is more difficult for a potential attacker to decrypt the firmware or program of the processing unit. For example, the use of statistical methods to decipher an encrypted machine language code may be more difficult than without an encryption depending on an internal state of a register. The machine instruction jmp in the box 85 is once encrypted by the hexadecimal expression 0xBE and the second time by the hexadecimal expression 0x0C.

Figure 7:
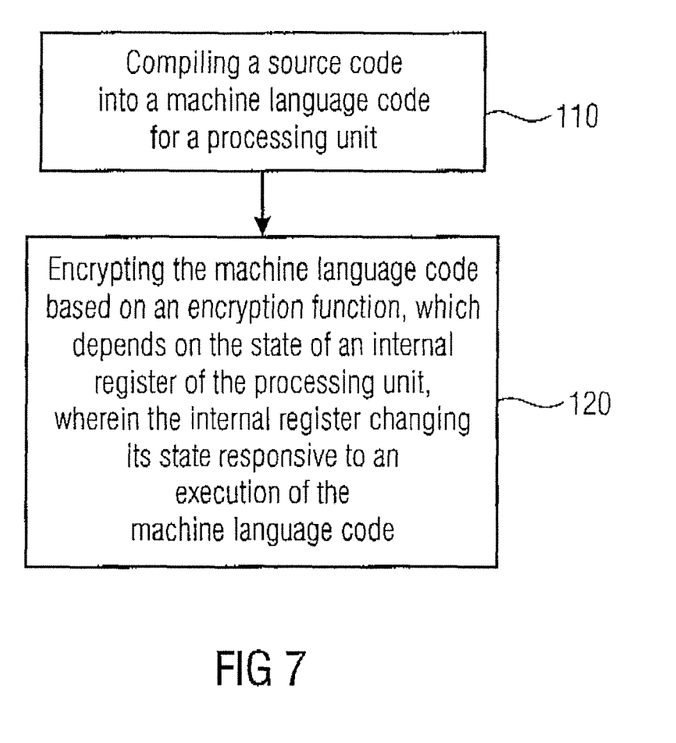
FIG. 7 shows a flowchart for a method of encrypting a source code into an encrypted machine language code according to an embodiment of the invention.

In FIG. 7, a flowchart for the method of compiling a source code into an encrypted machine language code is shown. The machine language code is executable on a processing unit, wherein the processing unit comprises an internal register changing its state responsive to an execution of the machine language code, as shown above. The method comprises compiling 110 the source code into a machine language code and encrypting 120 the machine language code based on an encryption function, which depends on the state of the internal register. The encryption function may be more complex, as it is shown in the embodiment of FIG. 6.

According to another embodiment of the method of compiling a source code, the processing unit may comprise a programmable register, and encrypting 120 the machine language code may be additionally based on an encryption function, which depends on the state of the programmable register. In other words, the encryption function may be more complex by using, for example, an additional programmable state register. A respective operator may program the state register. It may be programmed using a certain computer program or software.

Figure 8:
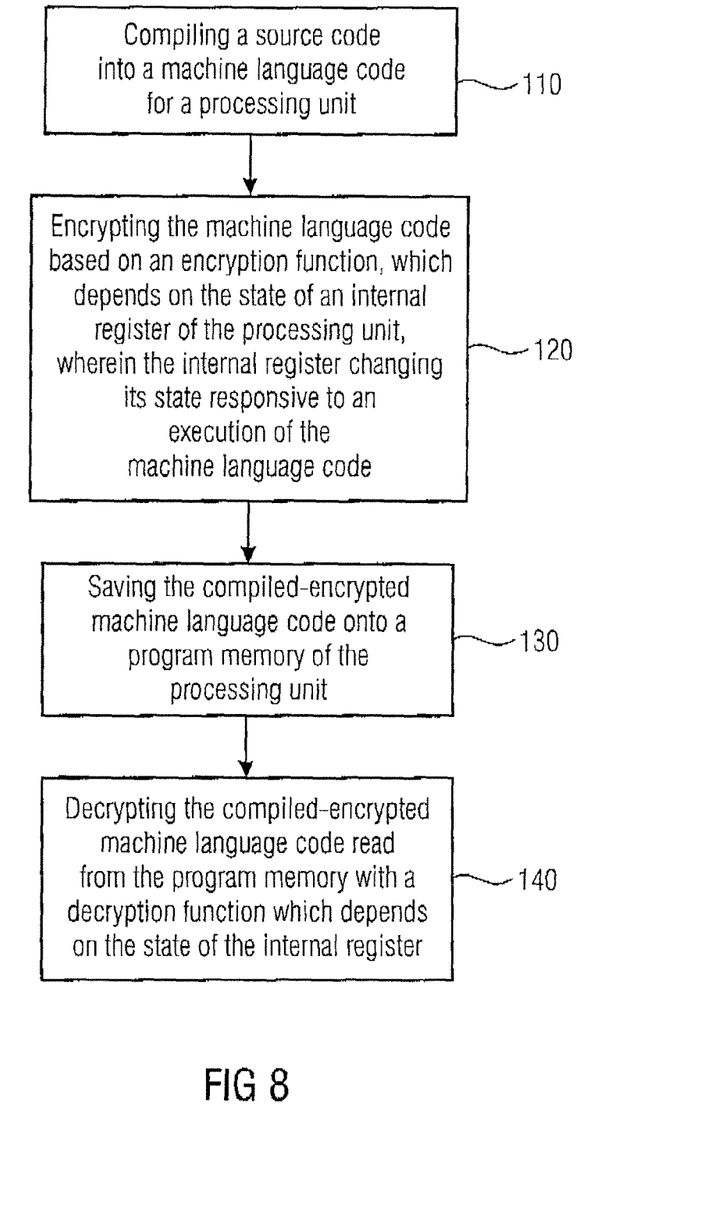
FIG. 8 shows a flowchart for a method of encrypting a source code into an encrypted machine language code.

In FIG. 8, a flowchart for the method of encrypting a source code into an encrypted machine language code is shown. The method is performed so that a decrypted machine language code of the encrypted machine language code is executable on a processing unit, wherein the processing unit comprises an internal register changing its state responsive to an execution of the machine language code, a program memory and a decryption unit.

The method is performed by compiling 110 a source code into a machine language code for the processing unit, by encrypting 120 the machine language code based on an encryption function, which depends on the state of the internal register of the processing unit. Furthermore, the method of encrypting comprises saving 130 the compiler-encrypted machine language code onto a program memory and decrypting 140 the compiler-encrypted machine language code read from the program memory with a decryption function that depends on the state of the internal register of the processing unit, so that the decrypted machine language code is executable on the processing unit.

The method may further comprise burning the compiler-encrypted machine language code onto a read-only memory (ROM). According to another embodiment of the method before saving 130 the compiler-encrypted machine language code, the compiler-encrypted machine language code may be encrypted a second time. The second encryption may be performed depending on a memory address where the machine language code is to be stored in the program memory.

According to a further embodiment of the method an address decrypting of the memory-address-dependently encrypted machine language code, with a decryption function, which depends on the memory address where the machine language code has been stored in the program memory, may be performed. The decrypting 140 may be performed by reading and decrypting word-by-word of the machine language code from a program memory and analyze the decrypted word, decide as to whether the decrypted word belongs to an instruction of the machine language code encompassing further words or not, and if the instruction does not encompass further words, execute the instruction on the processing unit.

According to some embodiments of the invention, the method of encrypting a source code can be performed during the generation of the machine language code. That means the operation codes may already be encrypted during the generation of the machine language code through a tool chain.

According to embodiments of the invention, the encrypted machine language code which is stored in the program memory of the processing unit or system can be deduced from the generic CPU OP code (operation code) and an expected internal state of the CPU. In one embodiment of the invention, a logic exclusive OR operation (XOR) between the generic operation code and the actual value of the program counter can be performed for encrypting the machine language code. A respective instruction decoder 65 of the CPU has to take this into account in order to interpret the machine language code in a correct manner and execute a correct generic operation code on the processing unit.

According to embodiments of the invention, the method may also protect, for example, a security micro-controller, a processing unit or a central processing unit against a forcing attack of the address lines of a program memory. A forcing attack on an address line of a program memory may change encrypted operation codes, which can no longer be decrypted correctly afterwards. As a consequence, there may be a high probability that an "illegal opcode operation exception" in the central processing unit occurs. A prerequisite for such an "illegal opcode operation exception" is that the instruction set comprises a respective structure for an "illegal opcode operation exception".

According to embodiments of the invention, more effective measures can be taken against jumping because of forcing address, data or command lines in a processing unit. According to embodiments of the invention, the respective machine language code may comprise check bits so that the integrity of an instruction or a word of an instruction can be checked. According to other embodiments of the invention, the encryption function and the respective decryption function may comprise a higher complexity as described herein. In some embodiments of the invention, the processing unit may comprise additional hardware components, e.g. registers, programmable registers, logical gates, or logical circuits for generating a more complex encryption function and a respective decryption function. According to an embodiment of the invention, an additional programmable register may be used in order to generate an encryption function. The programmable register can be programmed with a certain software.

According to further embodiments of the invention additional measures for increasing the security for security applications against, for example, an external disturbance, an external forcing of a certain state of the security application or a forced jumping in the program or firmware of the security application can be provided. In order to keep the function and the program of micro-controllers secure, proprietary instructions may be used or the program memory and/or the bus systems on the microcontroller may be encrypted.

According to another embodiment of the invention instead of internal state of a program counter register any other state register within the processing unit, e.g. a separate junction register can be used for defining an encryption function, which can be used by the compiler system. In this case, for example, the compiler has to ensure that at the beginning of the execution of the compiler-encrypted machine language code the respective state register has to be at a predetermined state.

While this invention has been described in terms of several embodiments, there are alterations, permutations and equivalents which fall within the scope of this invention. It should also be noted that there are many alternative ways of implementing the encryption function, the decryption function and the method and compositions of the present invention. It is therefore intended that the following appended claims be interpreted as including all such alterations, permutations and equivalents as fall within the true spirit and scope of the present invention.

The invention claimed is:

1. A processing unit for executing a machine language code comprising:
    a register for a program counter;
    execution circuitry configured to execute the machine language code which is compiled and encrypted based on an expected state of the program counter of the processing unit by a compiler extern to a chip on which the processing unit resides;
    a fetcher configured to fetch a word from an address of a program memory connectable to the processing unit, wherein the address corresponds to the current state of the program counter and, the program counter being configured to be incremented upon fetching in accordance to a length of the respective word;
    a decryption unit configured to decrypt the word fetched from the program memory;
    an instruction decoder configured to analyze the decrypted word, decide as to whether the decrypted word belongs to an instruction encompassing a further word or not and, if the instruction does not encompass a further word, drive the execution circuitry according to the instruction.

2. The processing unit according to claim 1, wherein the processing unit comprises the program memory, in which the compiled-encrypted machine language code is stored by the extern compiler, and an internal register changing its state responsive to an execution of the machine language code, and wherein the decryption unit is configured to decrypt an encrypted machine language code received from the program memory based on a decryption function, which depends on the state of the internal register, and wherein the decrypted machine language code is executable on the processing unit.

3. The processing unit according to claim 2, wherein an instruction of the machine language code comprises payload data, the state of which influences a behavior of the processing unit and error detection data enabling checking an integrity of the payload data and representing don't-care data with respect to the behavior for the processing unit, wherein the processing unit further comprises an error detection unit, wherein the decryption unit is configured to decrypt an encrypted machine language code received from the program memory and, wherein the error detection unit is configured to compare the error detection data of the decrypted machine language code with expected error detection data and provide a feedback signal indicating whether the error detection data of the machine language code is different from the expected error detection data.

4. The processing unit according to claim 1, wherein the processing unit further comprises a programmable register, an internal register changing its state responsive to an execution of the machine language code and wherein the decryption unit is configured to decrypt the word fetch from the program memory based on a decryption function, which depends on the state of the internal register and the state of the programmable register, and wherein the decrypted machine language code is executable on the processor unit.

5. The processing unit according to claim 1, wherein the fetcher is configured to fetch word-by-word the machine language code from an address of the program memory corresponding to the current state of the program counter, wherein the decryption unit is configured to decrypt the word-by-word machine language code fetched from the program memory and to analyze the decrypted word, decide as to whether the decrypted word belongs to an instruction of the machine language code encompassing further words or not and if the instruction does not encompass further words, drive an execution circuitry of the processing unit according to the instruction of the machine language code.

6. The processing unit according to claim 2, wherein the program memory is a read-only memory onto which the compiler-encrypted machine language code is burned.

7. The processing unit according to claim 2, wherein machine language code is encrypted so that a length of the machine language code in plaintext is maintained.

8. A processing unit comprising:
a register for a program counter;
execution circuitry configured to execute the machine language code which is compiled and encrypted based on an expected state of the program counter of the processing unit by a compiler extern to a chip on which the processing unit resides;
a memory decryption unit configured to decrypt instructions received from a program memory in which the compiled-encrypted machine language code is saved and which is connectable to the processing unit depending on a memory address pointing to a memory location where the instruction is stored;
an instruction decryption unit configured to decrypt the memory-address-dependently encrypted instructions depending on a current state of the program counter; and
an instruction decoder configured to decode the program-counter-dependently decrypted instructions and to drive the execution circuitry accordingly.

9. The processing unit according to claim 8, wherein the memory decryption unit is further configured to decrypt a word of the instruction and wherein an instruction comprises at least one word.

10. The processing unit according to claim 9, wherein the program memory comprises a plurality of memory blocks, and wherein the program memory is configured to store a plurality of instructions in a memory block.

\* \* \* \* \*